(12) United States Patent
Bafna et al.

(10) Patent No.: US 10,339,560 B2
(45) Date of Patent: Jul. 2, 2019

(54) MOBILE APPLICATION USAGE-BASED REVENUE TARGETING SYSTEMS AND METHODS

(71) Applicant: OATH INC., New York, NY (US)

(72) Inventors: Rahul Bafna, San Francisco, CA (US); Mubeen Afzal, San Francisco, CA (US); Greg Gardner, San Francisco, CA (US); Simon Khalaf, San Francisco, CA (US); Rahul Oak, San Francisco, CA (US)

(73) Assignee: OATH INC., New York, NY (US)

( * ) Notice: Subject to any disclaimer, the term of this patent is extended or adjusted under 35 U.S.C. 154(b) by 1307 days.

(21) Appl. No.: 13/902,684

(22) Filed: May 24, 2013

(65) Prior Publication Data

US 2014/0040017 A1    Feb. 6, 2014

Related U.S. Application Data

(60) Provisional application No. 61/678,352, filed on Aug. 1, 2012.

(51) Int. Cl.
  *G06Q 30/02*  (2012.01)
(52) U.S. Cl.
  CPC ..... *G06Q 30/0246* (2013.01); *G06Q 30/0204* (2013.01); *G06Q 30/0254* (2013.01)
(58) Field of Classification Search
  USPC .......................................................... 705/14
  See application file for complete search history.

(56) References Cited

U.S. PATENT DOCUMENTS

| | | | |
|---|---|---|---|
| 9,053,105 B2 | 6/2015 | Chatani | |
| 2009/0198579 A1 | 8/2009 | Lewis et al. | |
| 2009/0234815 A1* | 9/2009 | Boerries | G06F 17/30867 |
| 2011/0208585 A1 | 8/2011 | Daboll et al. | |
| 2011/0238496 A1* | 9/2011 | Gurbuxani | G06Q 30/02 |
| | | | 705/14.49 |
| 2011/0288931 A1* | 11/2011 | Kuhn | G06F 17/30864 |
| | | | 705/14.49 |
| 2012/0331112 A1 | 12/2012 | Chatani | |

(Continued)

FOREIGN PATENT DOCUMENTS

| | | |
|---|---|---|
| CN | 102027497 A | 4/2011 |
| WO | 2011129047 A1 | 10/2011 |

OTHER PUBLICATIONS

International Application No. PCT/US2013/053297, International Search Report and Written Opinion dated Oct. 10, 2013.

(Continued)

*Primary Examiner* — Patricia H Munson
(74) *Attorney, Agent, or Firm* — James J. DeCarlo; Greenberg Traurig, LLP

(57) ABSTRACT

Disclosed is a method that includes: profiling a set of mobile applications according to revenue-related parameters; tracking a user's interaction with a mobile application; scoring the user's interaction levels, and based on the score, grouping users into mobile analytics groups associated with the targeting profiles; facilitating the transmission of user information, user interaction data, and specific mobile analytics groups to advertising campaigns. The method may be executed on a digital device. A related system is disclosed.

15 Claims, 9 Drawing Sheets

(56) References Cited

U.S. PATENT DOCUMENTS

2013/0014040 A1* 1/2013 Jagannathan .......... G06Q 50/01
715/765
2013/0218667 A1* 8/2013 Mohamed .............. G06Q 30/02
705/14.45

OTHER PUBLICATIONS

Official Action to corresponding Chinese Application No. 201380039608.9 dated Nov. 28, 2016 (6 pages).
Brandontreb: "How To Integrate Google Analytics Tracking Into Your Apps In 7 Minutes," Internet Article, http://www.codeblog.com/2010/04/22/how-to-integrate-google-analytics-tracking-into-your-apps-in-7-minutes, 12 pages (2010).
Conder et al., "Android Wireless Application Development (2nd Edition)," pp. 576-577 (2010).
Cutroni: "NEW! Google Analytics Moble App Tracking: Data & Reports," Internet Article, http://cutroni.com/blog/2012/06/29/google-analytics-mobile-app-tracking-data-and-reports, 18 pages (2012).
Ganesan: "Setting up Aalytics for your Android App," Internet Article, http://opensourceforu.efytimes.com/2011/01/setting-up-analytics-for-your-adroid-app, 5 pages (2011).
Hughes: "Android Apps Marketing: Secrets to Selling Your Android App," Chapter 17, 20 pages (2010).
Kaushik: "Web Analytics 2.0: The Art of Online Accountability and Science of Customer Centricity," chapters 4, 8 and 9 (2009).
Lucas: "Analytics for Android Apps," Internet Article, http://android-developers.blogspot.de/2010/12/analytics-for-android-apps.html(2010).
Supplementary European Search Report to corresponding EP Application No. 13824769 dated Jan. 18, 2016 (4 pages).
Tanebaum et al., Distributed Systems: Principles and Paradigms (2nd Edition), 87 pages (2006).
Windley: "The Live Web: Building Event-Based Connections in the Cloud," Course Technology PTR, 25 pages (2011).

* cited by examiner

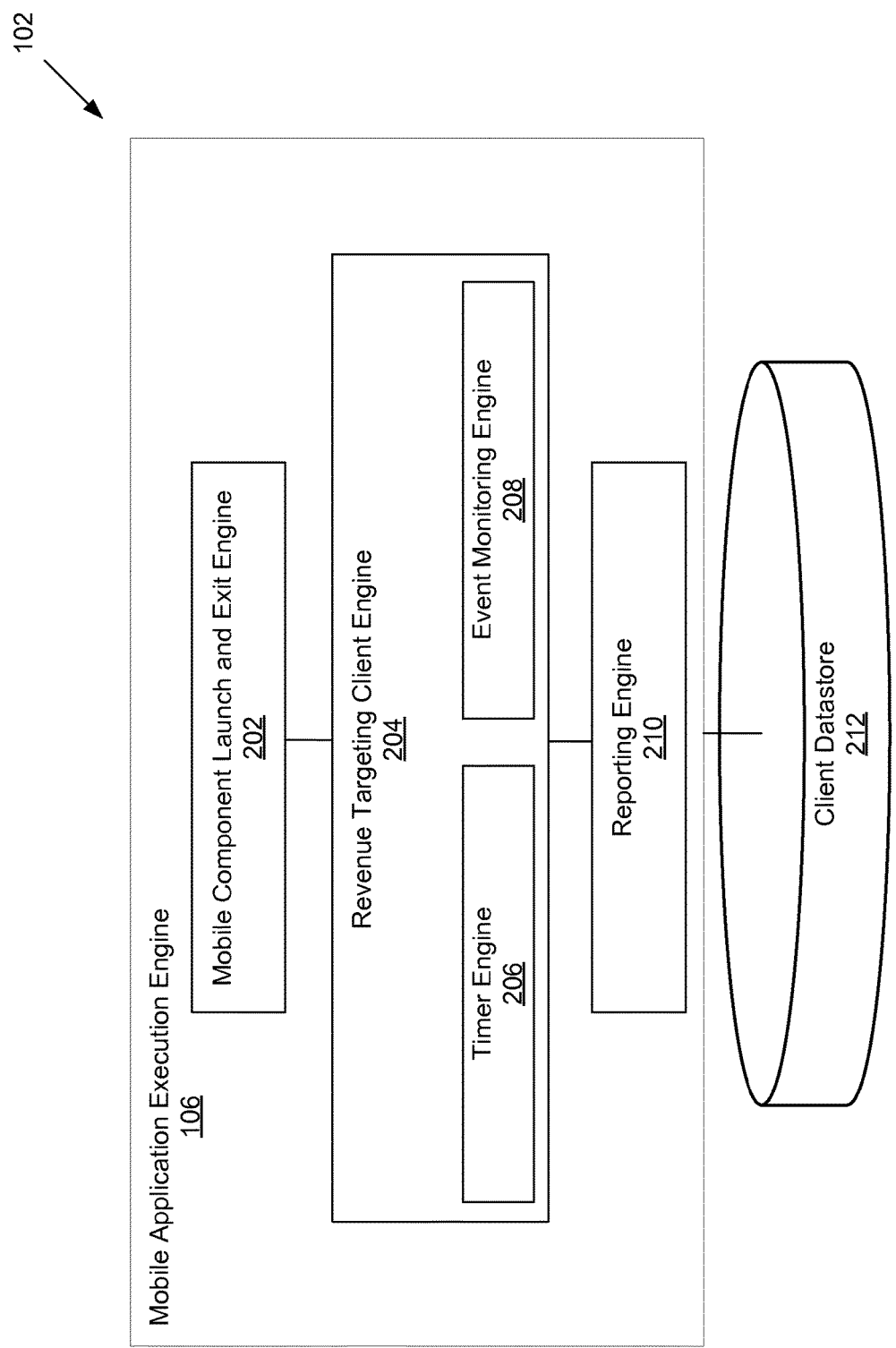

MOBILE APPLICATION USAGE-BASED REVENUE TARGETING SYSTEMS AND METHODS

CROSS-REFERENCE TO RELATED APPLICATIONS

The present application claims benefit of and priority to U.S. Provisional Patent Application No. 61/678,352 filed Aug. 1, 2012, entitled "Mobile Application usage-Based Targeting Systems and Methods," which is incorporated by reference herein.

TECHNICAL FIELD

The technical field relates to mobile application systems and methods. More particularly, the technical field relates to systems and methods to determine usage of mobile applications and derive revenue based on the usage.

BACKGROUND

Mobile application usage has become an important part of daily life with the spread of wireless data networks and the rising processing power of mobile devices. These and other factors have allowed mobile application developers to create travel applications, personal organizers, video games, and other mobile applications that deliver the full informational capabilities of the Internet to broad segments of mobile users. Developers have also created mobile applications that seek to creatively engage users based on the highly-accessible user-interfaces of many mobile devices. The resulting revolution in mobile applications has provided mobile device users with powerful informational capabilities and unique interactive experiences.

Developers of mobile applications have conventionally employed two common monetization models. One common monetization model has involved selling mobile applications over the Internet or a mobile application marketplace. The sale requires a mobile user to pay a one-time fee for use or purchase a subscription that activates the mobile application for a period of time. Another common monetization model has involved selling advertisements that are integrated into a mobile application. Under an advertisement-based monetization model, a developer negotiates advertisements with third-party advertisers and strategically places content into the user-interface of the mobile application. Both monetization models have provided developers with the potential to generate revenue.

However, existing monetization models have not proven effective. For instance, users have traditionally resisted purchasing an application under a sales-based monetization model. More specifically, many have resisted providing financial information required to pay for an application under a sales-based monetization model. People have gravitated toward free applications, even those of inferior quality, over applications that they have to pay for. Users have typically found advertisement-based monetization models to be annoying and to detract from a mobile application's ability to engage them. As a result, existing mobile application monetization models do not adequately allow developers to monetize the sales of mobile applications.

SUMMARY

Disclosed are mobile application usage-based revenue targeting systems and methods. A server method may include: profiling a set of mobile applications according to revenue-related parameters; tracking a user's interaction with a mobile application; scoring the user's interaction levels, and based on the score, grouping users into mobile analytics groups associated with the targeting profiles; and facilitating the transmission of user information, user interaction data, and specific mobile analytics groups to advertising campaigns. The server method may be executed on a digital device.

A server system may include a server that includes a targeting profile engine, a mobile analytics group creation engine, a user information provisioning engine, an application datastore, a user datastore, and a mobile analytics group datastore. The targeting profile engine may include a mobile analytics time selection engine, a mobile application selection engine, an application description capture engine, an application description parsing engine, and a targeting profile management engine. Some or all of the targeting profile engine may be coupled to the application datastore. In various embodiments, the mobile analytics group creation engine may include a user-profile gathering engine coupled to the targeting profile engine, a user and application usage gathering engine coupled to the user datastore, and a usage scoring and mobile analytics grouping engine coupled to the user-target profile gathering engine and the user and application usage gathering engine.

A client method may include beginning execution of a mobile application, launching a revenue targeting client, initiating a mobile application timer, and monitoring for mobile-application specific triggers. In some embodiments, if no mobile application-specific trigger is detected, the client method may involve evaluating whether an instruction to exit the mobile application was received. Further, if a mobile application-specific trigger is detected, the client method may include reporting a mobile application-specific event associated with the trigger. Then, the client method may involve evaluating whether an instruction to exit the mobile application was received. If no instruction to exit the mobile application is received, the client method may include: ending the mobile application timer, reporting the mobile application usage time, ending the revenue targeting client, and providing an instruction to exit the mobile client. The client method may be executed on a digital device.

A client system may include a mobile application execution engine coupled to a client datastore. The mobile application execution engine may be configured to execute a mobile application on a mobile device; the mobile application execution engine may also include: a mobile component launch and exit engine, and a revenue targeting client engine. The revenue targeting client engine may include a timer engine and an event monitoring engine, and a reporting engine. In various embodiments, some or all of the mobile component launch and exit engine, the revenue targeting client engine, and the reporting engine may be coupled to the client datastore.

BRIEF DESCRIPTION OF THE DRAWINGS

FIG. 2 depicts an exemplary mobile device, including a mobile application execution engine and a client datastore, according to some embodiments.

DETAILED DESCRIPTION OF EMBODIMENTS

Figure 1:
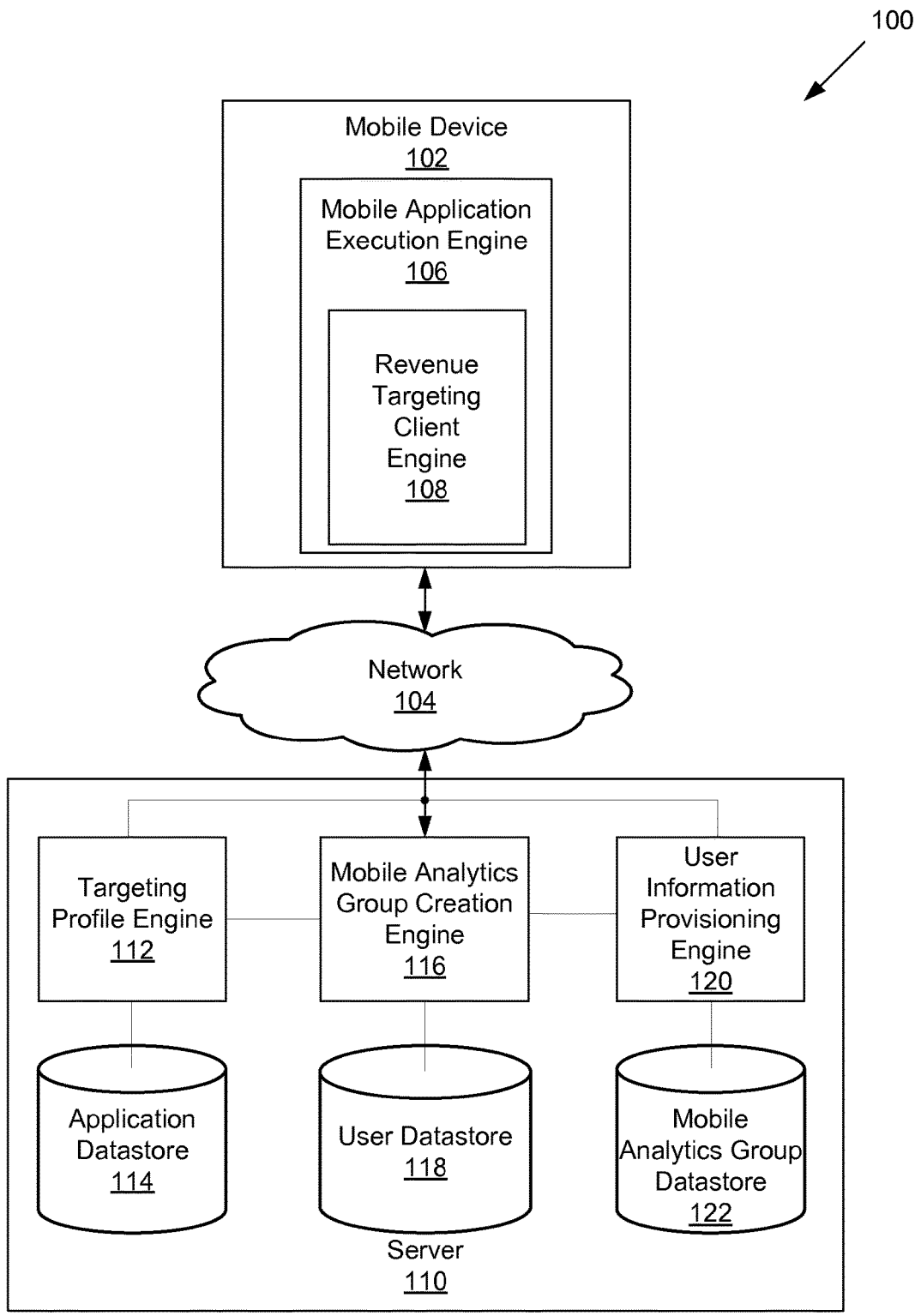
FIG. 1 depicts an exemplary mobile system operating environment, according to some embodiments.

FIG. 1 depicts a mobile system operating environment 100, according to some embodiments. The mobile system operating environment 100 may include a mobile device 102, a network 104, and a server 110.

Figure 8:
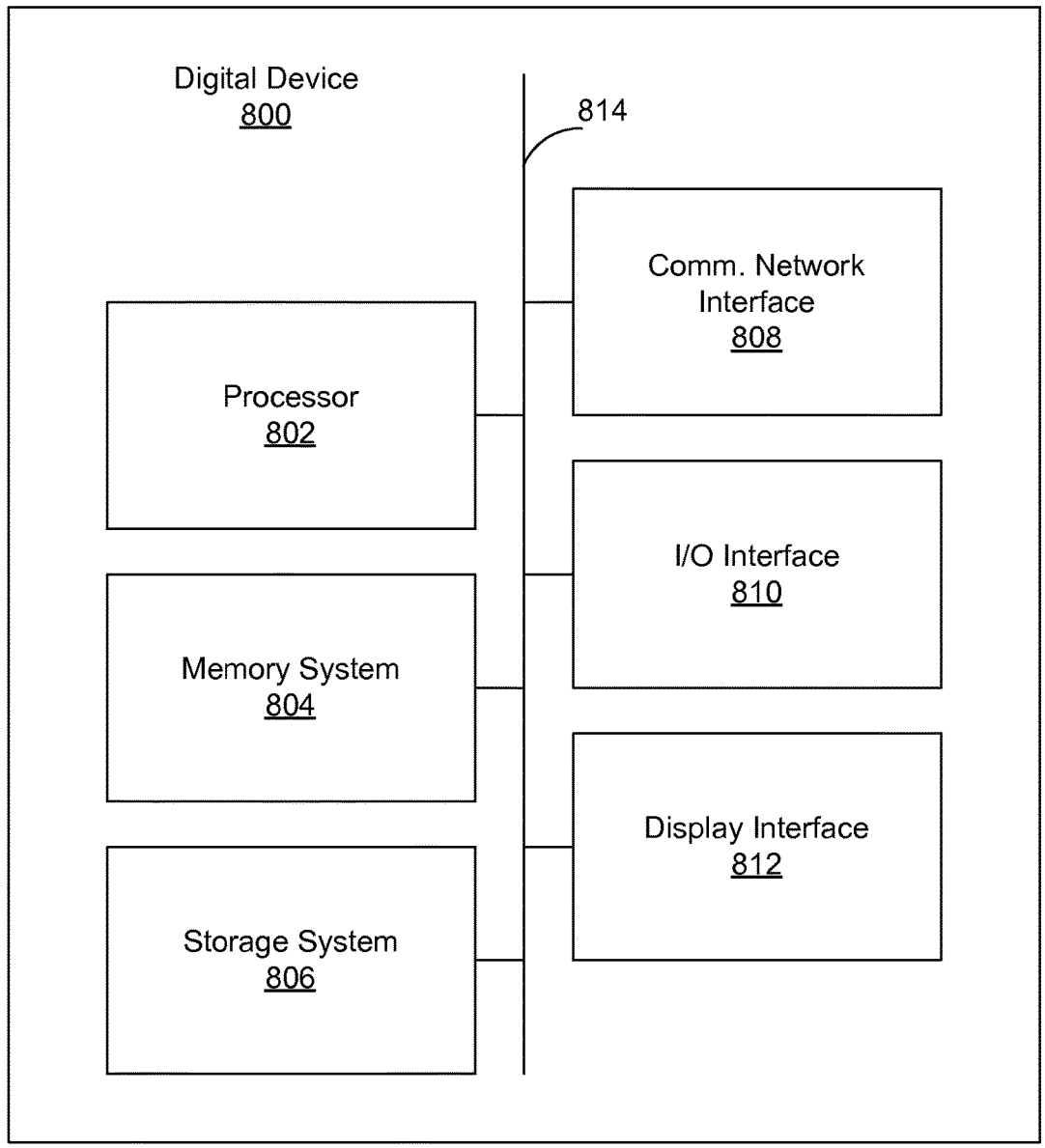
FIG. 8 depicts an exemplary computer system, according to some embodiments.

The mobile device 102 may be any digital device. A digital device is an electronic device having memory and a processor. The mobile device 102 may incorporate some or all of the elements of a computer system, an example of which is shown in FIG. 8. The mobile device 102 may incorporate an operating system, such as a mobile operating system, and may support a connection to the network 104 (which in various embodiments may be a wireless data network). In various examples, the mobile device 102 may be a cellular phone, a smartphone, a computing tablet, a laptop, or other digital or electronic device.

The mobile device 102 may include a mobile application execution engine 106, which in turn may include a revenue targeting client engine 108. The mobile application execution engine 106 may comprise hardware and/or software to execute mobile applications. A "mobile application," as used herein, is a set of computer instructions executed on a processor of the mobile device 102, and is used to perform a set of tasks. The mobile application may include startup protocols to enable the operating system on the mobile device 102 to load the mobile application from memory and/or storage on the mobile device 102. The mobile application may include shutdown protocols to enable the operating system on the mobile device 102 to remove the mobile application from the memory and/or the storage on the mobile device 102. In various embodiments, the startup and/or shutdown protocols may also respectively load and/or remove the components of the mobile application from the memory and/or the storage.

The mobile application may have been developed using a developer's kit, such as a mobile application software developer's kit (SDK). As used herein, an "SDK" is a set of developer's tools that allows the creation of applications or packages of applications. The mobile application SDK may include templates or libraries that a developer can use to build an executable application. In various embodiments, the mobile application need not have been developed with a mobile application SDK and may have been developed in other ways.

The mobile application execution engine 106 may incorporate the revenue targeting client engine 108. The revenue targeting client engine 108 may include hardware and/or software operative to monitor usage of a mobile application. In one example, the revenue targeting client engine 108 may be configured to report a time that a user has spent using the mobile application. The revenue targeting client engine 108 may also monitor usage of the mobile application by keeping track of events occurring within or by the mobile application. An "event," as used herein, is an action that results from activity of the mobile application. The event may be caused by occurrences within the application or outside the mobile application (such as occurrences related to the operating system, hardware, software, or events initiated by a user of the application). In some embodiments, the revenue targeting client engine 108 may implement a timer and/or monitor a specified list of event triggers from the mobile application, the operating system, or other devices (e.g., the input device, the output device, and/or hardware). As used herein, a "trigger" is an event in a mobile application that, once occurring, causes another event in the mobile application or a related mobile application to occur.

In some embodiments, the trigger may comprise a "mobile application-specific trigger," that is, a trigger unique to a particular mobile application or a set of mobile applications. In various embodiments, the mobile application-specific trigger may include a trigger related to a state of the mobile application. As used herein, a "state" of a mobile application is a configuration of information (such as the data in memory, the data in a client datastore, the data associated with user input and/or output, and other data) in the mobile application. Examples of states of a mobile application include without limitation: points or levels in a game, specific data entered (e.g., a destination entered in a travel application, a purchase amount entered into a shopping application), data that the mobile application is presently writing or previously wrote into the client datastore, physical memory or other system parameters at a given time, and/or a user's location derived from a geography-based transmitter such as a Global Positioning System (GPS) unit.

In some embodiments, the revenue targeting client engine 108 may be configured to target revenue generation based on mobile application usage. As used herein, "targeted revenue generation" is the directed communication or marketing of materials or concepts toward particular segments of mobile application users who are likely to respond in a similar way. A "targeted revenue generation source" is an entity that provides the communication or marketing for targeted revenue generation. An example of a targeted revenue generation source is an advertiser who directs particular advertisements at particular segments of mobile application users.

The revenue targeting client engine 108 may have been developed using a specialized revenue targeting SDK. As used herein, a "specialized revenue targeting SDK" is an SDK that allows application developers to link application activity to revenue sources. As used herein, a "revenue source" is an entity that provides applications with revenue for the actions of applications users. An example of a revenue source may be an advertiser seeking to monetize how a user engages with an application. The advertiser may be an entity that is distinct from the mobile application developer, or may be the same entity as the mobile application developer. The revenue targeting SDK may include compilers, linkers, and/or other programs that allow a mobile application developer to time mobile application usage and monitor events as well as related event triggers on the mobile application. In various embodiments, the revenue targeting client engine 108 need not have been developed with a revenue targeting SDK and may have been developed in other ways.

In some embodiments, the revenue targeting client engine 108 may be incorporated into a mobile application circle. As used herein, a "mobile application circle" is a set of mobile applications that share targeted revenue generation information between one another. In some embodiments, the mobile application circle may be implemented as a set of mobile applications that were developed using a common revenue targeting SDK. The mobile application circle may include mobile applications having a common subject matter, such as travel. The mobile application circle may also include mobile applications having distinct subject matters.

Figure 4:
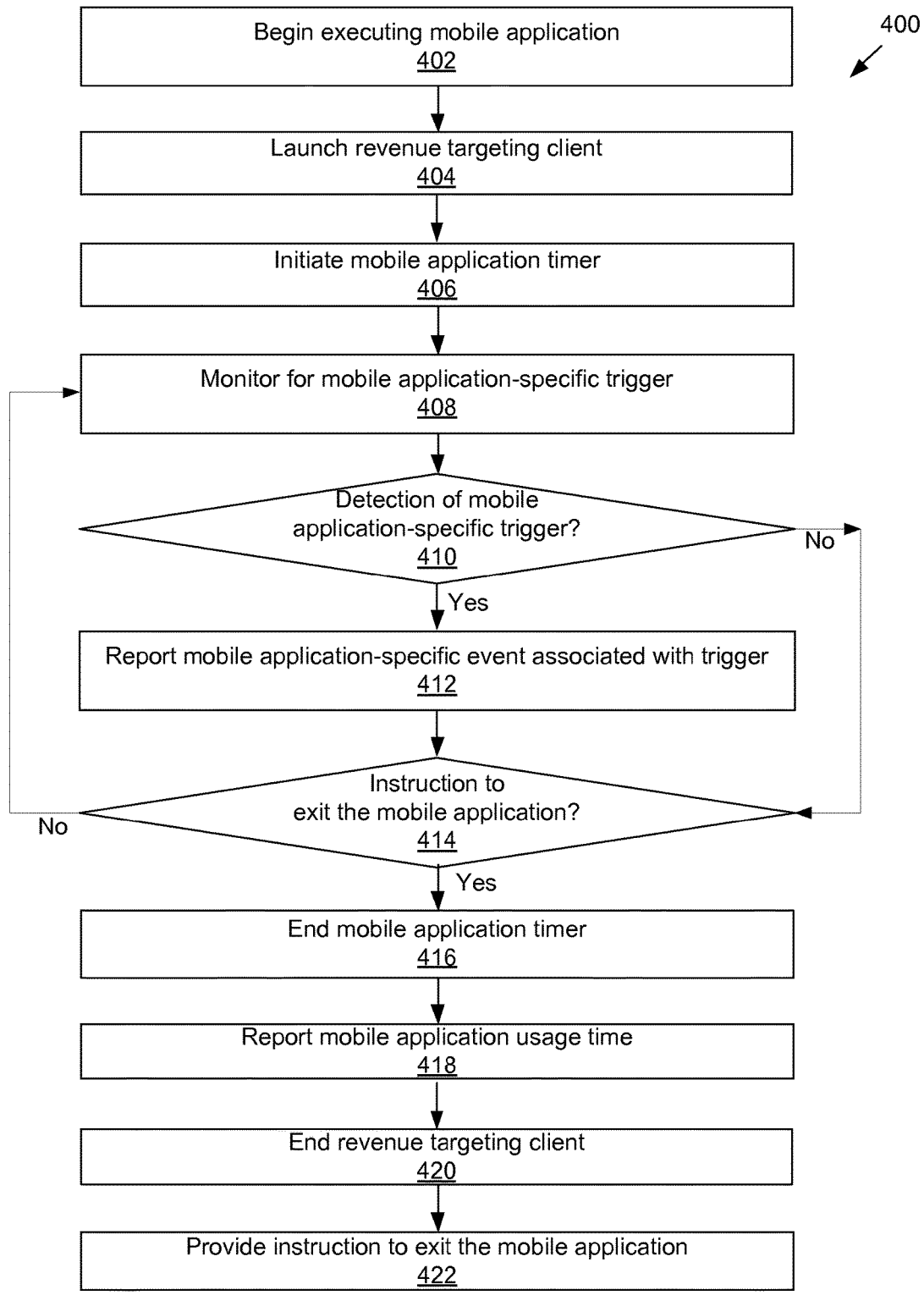
FIG. 4 depicts an exemplary flow diagram of a method for detecting and reporting mobile application-specific triggers, according to some embodiments.

Although FIG. 1 depicts the revenue targeting client engine 108 residing within the mobile application execution engine 106, other variations are possible. In some embodiments, the revenue targeting client engine 108 may comprise a set of engines distributed between the mobile application execution engine 106 and the operating system of the mobile device 102. Further, in some embodiments, the revenue targeting client engine 108 need not reside on the mobile device 102 at all. In some embodiments, some or all of the revenue targeting client engine 108 may reside on another device (i.e., distinct from the mobile device 102) and may monitor usage of a specific mobile application on the mobile device 102 using a network connection (such as a connection over the network 104). For instance, some or all of the revenue targeting client engine 108 may reside on the server 110 without departing from the scope and substance of the inventive concepts described herein. FIGS. 2 and 4 explore examples of attributes of the mobile device 102, the mobile application execution engine 106, and the revenue targeting client engine 108 in greater detail.

Although FIG. 1 depicts the mobile device 102 as a "mobile device," in various embodiments, the element 102 may refer to any digital device generally having the functionalities described herein. For instance, the element 102 could refer to portions of a general-purpose computer. In embodiments where the element 102 refers to a digital device, the element 106 may refer to an application execution environment housing the revenue targeting client engine 108. Therefore, though FIG. 1 depicts a "mobile device" for illustrative simplicity, one of ordinary skill in the art will recognize that the methods and systems described herein can be implemented on non-mobile devices without departing from the scope and substance of the inventive concepts described herein.

The network 104 may facilitate a connection between the mobile device 102 and the server 110. The network 104 may include a computer network. The network 104 may be implemented as a personal area network (PAN), a local area network (LAN), a home network, a storage area network (SAN), a metropolitan area network (MAN), an enterprise network such as an enterprise private network, a virtual network such as a virtual private network (VPN), or other network. The network 104 may serve to connect people located around a common area, such as a school, workplace, or neighborhood. The network 104 may also connect people belonging to a common organization, such as a workplace. Portions of the network 104 may be secure and other portions of network 104 may be unsecured.

In some embodiments the network 104 may incorporate wireless network technologies. Wireless network technologies are computer networks that connect one or more devices to each other without the user of computer cables. Wireless networks may incorporate data packets into electromagnetic waves (e.g., radio frequency waves), and transmit the resulting packaged electromagnetic waves between devices. Compatible devices may have transmitters coupled to modulators that incorporate the information into the data packets. Compatible devices may also have receivers coupled to demodulators that extract information from the data packets.

The server 110 may be any digital device. The server 110 may incorporate some or all of the elements of a computer system, an example of which is shown in FIG. 8. The server 110 may incorporate an operating system and may support a connection to the network 104. In some embodiments, the operating system of the server 110 may comprise an enterprise-based operating system. The server 110 may also incorporate programs that serve the requests of applications, such as mobile applications executing on the mobile device 102. In various embodiments, the server 110 may be some combination of a database server, an application server, a file server, a mail server, a web server, a gaming server, or other kind of server.

The server 110 may include a targeting profile engine 112, an application datastore 114, a mobile analytics group creation engine 116, a user datastore 118, a user information provisioning engine 120, and a mobile analytics group datastore 122. Any or all of the targeting profile engine 112, the application datastore 114, the mobile analytics group creation engine 116, the user datastore 118, the user information provisioning engine 120, and the mobile analytics group datastore 122 may include hardware and/or software. Any or all of the targeting profile engine 112, the application datastore 114, the mobile analytics group creation engine 116, the user datastore 118, the user information provisioning engine 120, and the mobile analytics group datastore 122 may have been developed using an SDK.

Figure 3A:
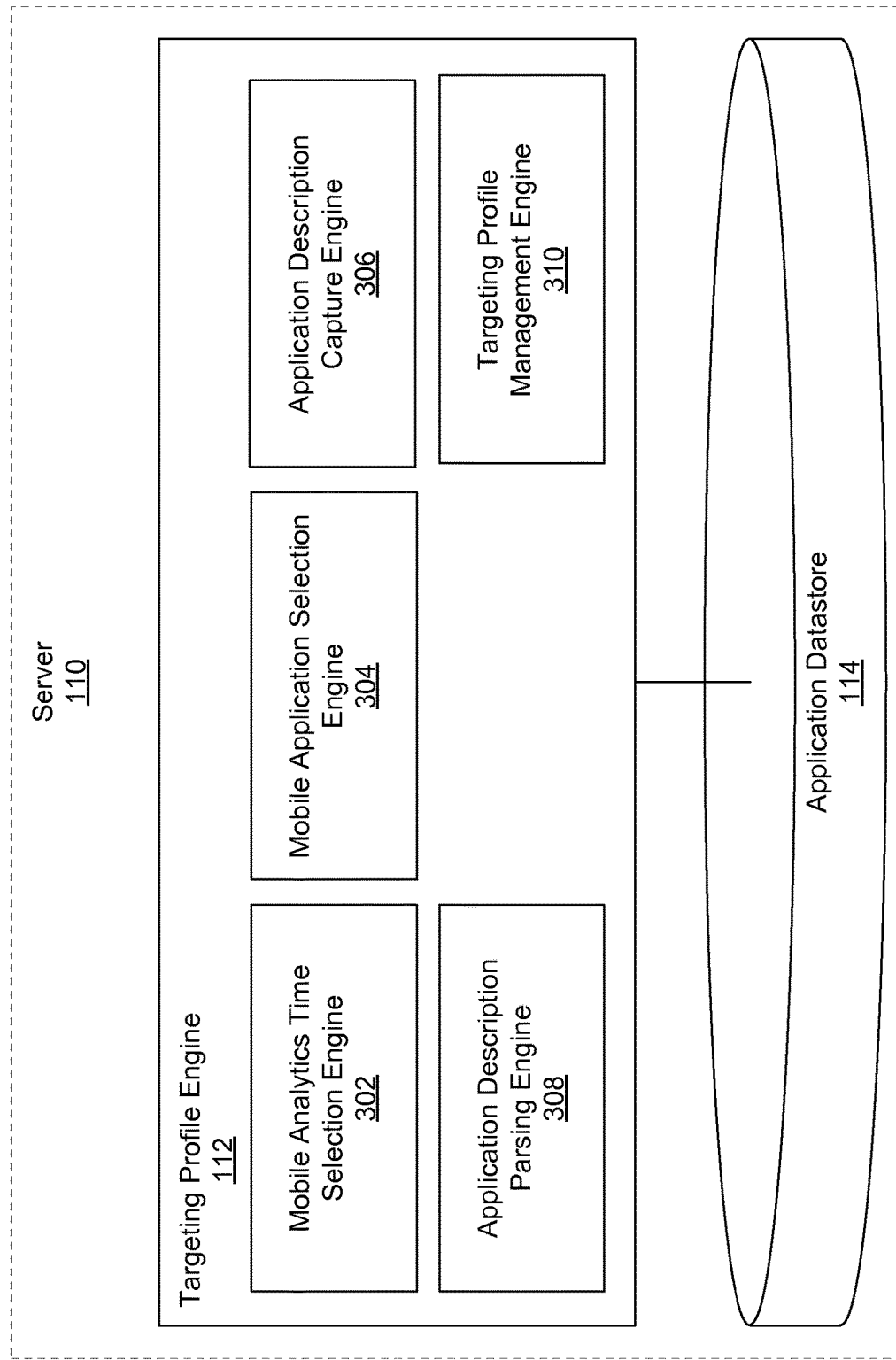
FIG. 3A depicts an exemplary server, including a targeting profile engine and an application datastore, according to some embodiments.
Figure 5:
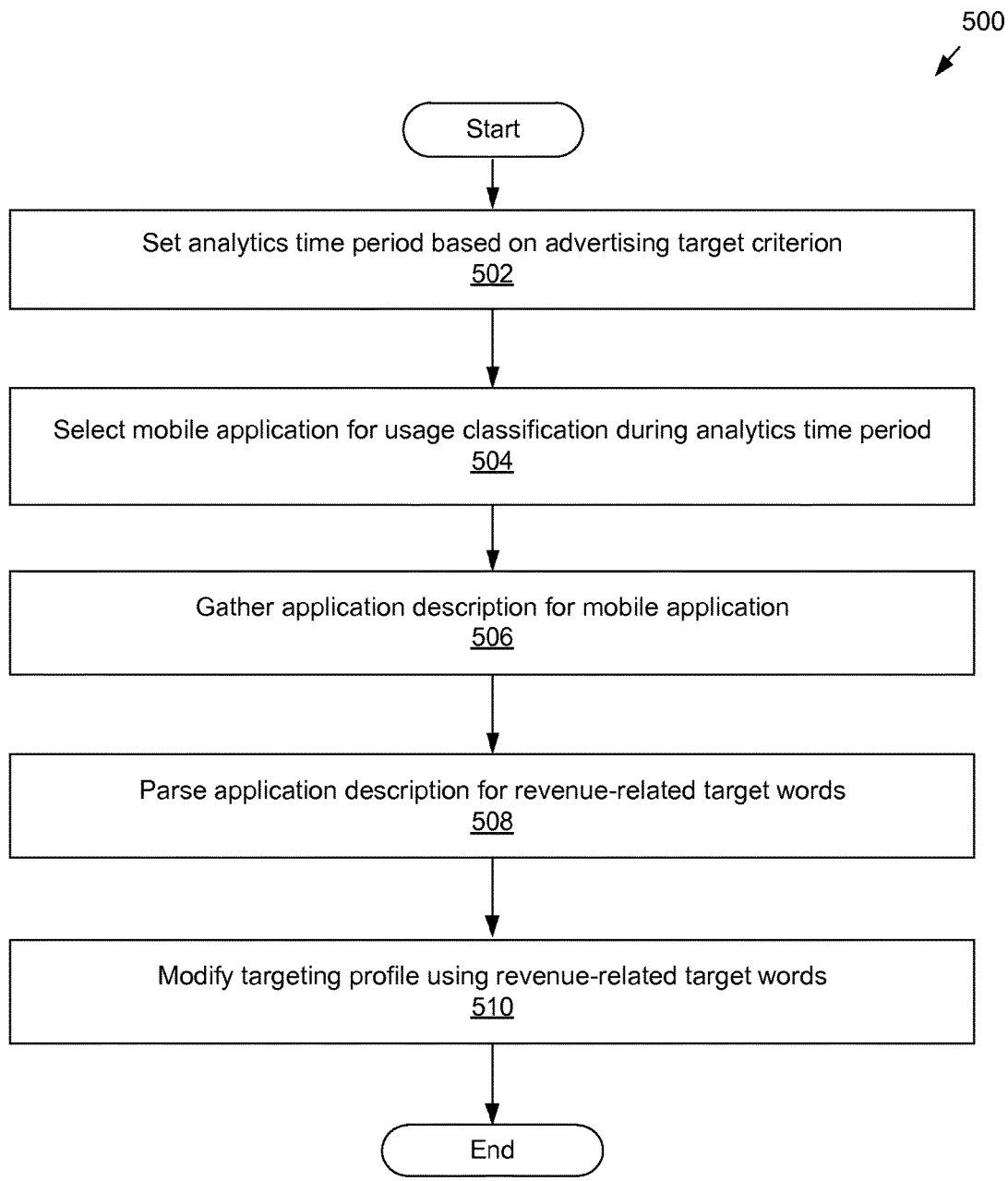
FIG. 5 depicts an exemplary flow diagram of a method for creating and/or managing a mobile-application revenue targeting profile for an analytics time period, according to some embodiments.

The targeting profile engine 112 may manage targeting profiles for one or more analytics time periods. As used herein, a "targeting profile" (alternatively referred to as a "persona") is a data structure that associates a group of potential purchasers with a set of mobile application descriptions. In some embodiments, targeting profiles may link users of mobile application to entities who seek to monetize how a user engages with an application. In various embodiments, the targeting profile engine 112 may retrieve a set of mobile application identifiers and mobile application descriptions from the application datastore 114. The targeting profile engine 112 may create a targeting profile, or a "persona," for the set of mobile application names and mobile application descriptions. In some embodiments, the set of mobile application descriptions may comprise the set of mobile applications in a mobile application circle. Table 1 and the discussion accompanying FIG. 3A will further provide examples of targeting profiles or "personas." The targeting profile engine 112 may provide the targeting profiles to the mobile analytics group creation engine 116. FIGS. 3A and 5 explore some examples of attributes of the targeting profile engine 112 and the application datastore 114.

The mobile analytics group creation engine 116 may group users into mobile analytics groups based on the mobile application usage patterns of the users. As used herein, a "mobile analytics group" is a data structure that associates a group of users with one or more groups of mobile applications that have similar revenue targeting goals. In some embodiments, the members in a mobile analytics group may have a common pattern of mobile application usage. For instance, members of a mobile analytics group may have used a similar type of mobile application(s) in a similar way, may have used a similar type of mobile application(s) for a similar duration of time, and/or may have encountered similar events on a similar type of mobile application(s). In various embodiments, mobile applications may have similar revenue targeting goals to one another.

Figure 3B:
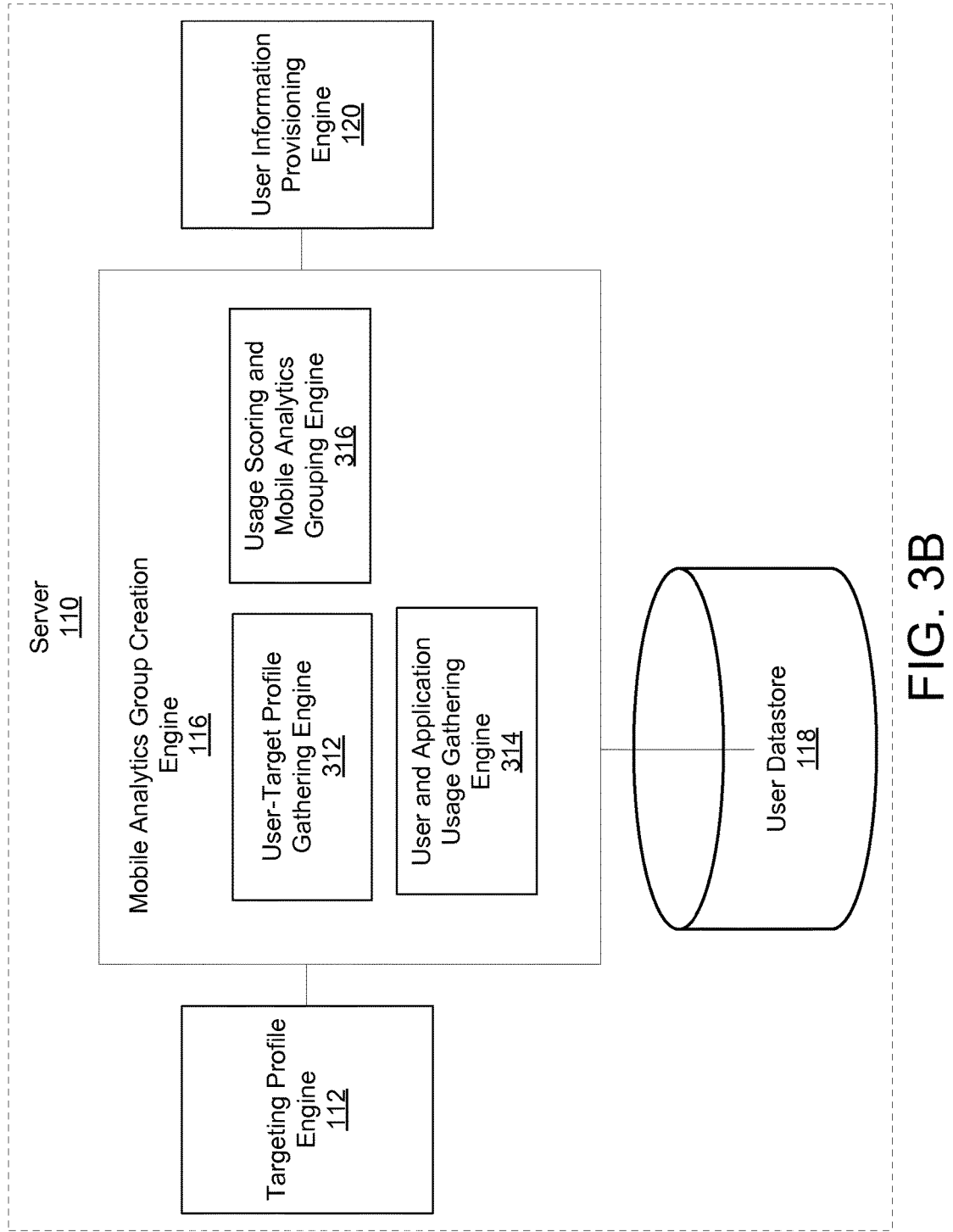
FIG. 3B depicts an exemplary server, including a targeting profile engine, a mobile analytics group creation engine, a user information provisioning engine, and a user datastore, according to some embodiments.
Figure 6:
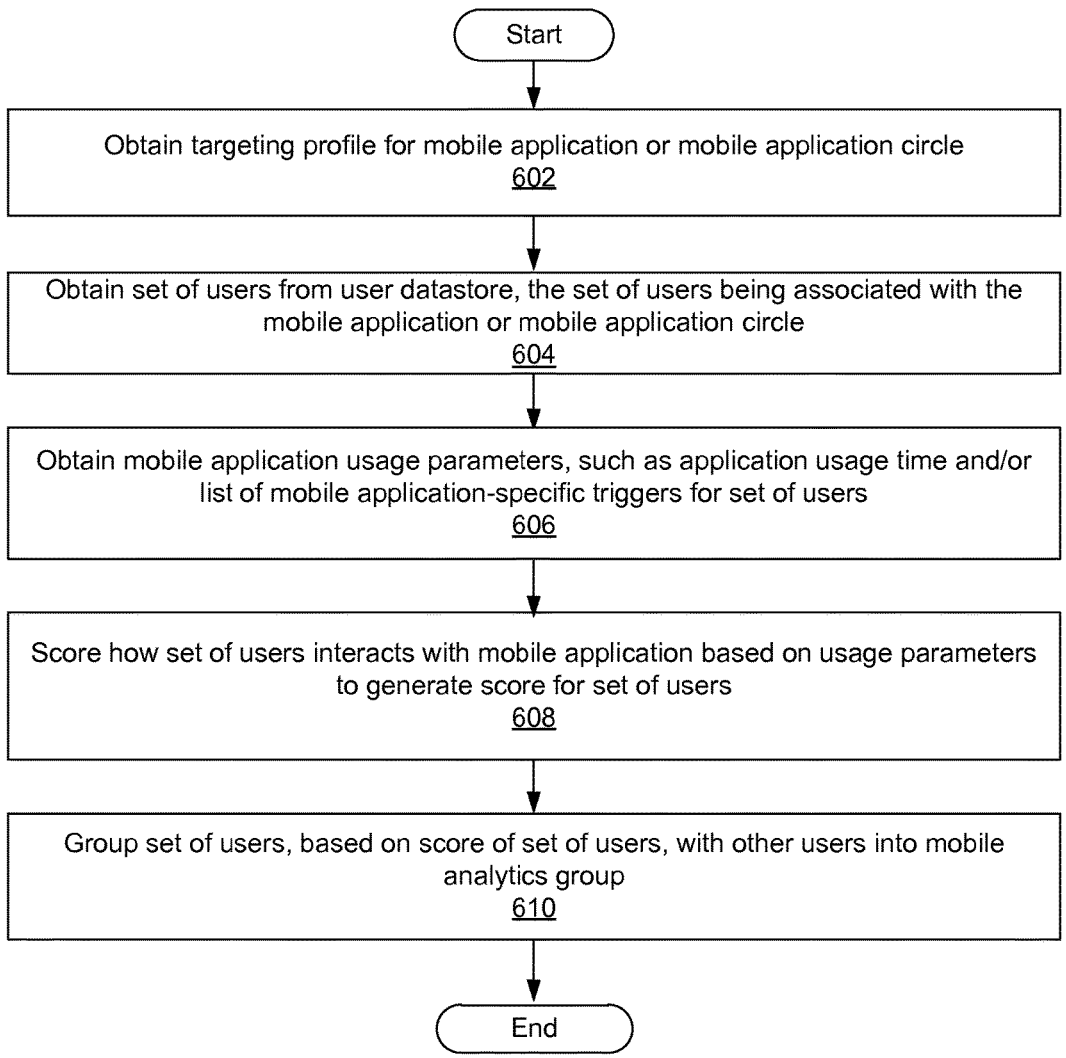
FIG. 6 depicts an exemplary flow diagram of a method for grouping mobile application users into mobile analytics groups, according to some embodiments.

In some embodiments, the mobile analytics group creation engine 116 may receive the targeting profiles from the targeting profile engine 112. The mobile analytics group creation engine 116 may also retrieve from the user datastore 118 sets of user identifiers who have installed a given mobile application. The mobile analytics group creation engine 116 may obtain from the user datastore 118 the amount of time a given user in a given set of users has used the mobile application, and the given user's response to various events occurring in the mobile application. In some embodiments, the mobile analytics group creation engine 116 may score one or more users' involvement in a particular mobile application based on the users' usage time and/or responses to the various events. The mobile analytics group creation engine 116 may further group sets of the users into mobile analytics groups for targeted revenue generation purposes. In some embodiments, the mobile analytics group creation engine 116 may also transmit one or more mobile analytics groups to the user information provisioning engine 120. FIGS. 3B and 6 further explore examples of attributes of the mobile analytics group creation engine 116 and the user datastore 118.

The user information provisioning engine 120 may provide information about mobile analytics groups to targeted revenue generation sources. In some embodiments, the user information provisioning engine 120 may interface with other engines (e.g., other server engines) to facilitate delivery of targeted advertising.

In some embodiments, the user information provisioning engine 120 may supply an advertiser with a name of a specific mobile analytics group or set of mobile analytics groups. For instance, the user information provisioning engine 120 may provide an advertiser with the group name "Business Traveler," to designate a group of individuals whose mobile analytics patterns of use correspond to a profile associated with the usage patterns of business travelers. Advantageously, the user information provisioning engine 120 need not provide the advertiser with any personally identifiable information of the individuals in the provided mobile analytics group. As used herein, "personally identifiable information" (PII) is information that would allow someone to find the identity of a particular mobile application user. PII may include a user's name, contact information, financial information, identification information (e.g., Social Security Numbers or biometric information), or other information that would allow the user to be personally identified.

In some embodiments, the user information provisioning engine 120 may supply an advertiser with a mobile analytics group (designated generally by group name, for instance) without providing the PII about members of the mobile analytics group. In various embodiments, the user information provisioning engine 120 may use security measures to secure access of the PII of individuals in a mobile analytics group from advertisers. After supplying the advertiser with the name of a specific mobile analytics group or set of mobile analytics groups, the user information provisioning engine 120 may receive advertising content from advertisers and may push advertising content to members of one or more mobile analytics groups based on an advertiser's preferences.

In some embodiments, the user information provisioning engine 120 may provide mobile analytics group information about a specific user if an advertiser requests the specific user's mobile analytics group information. For instance, an advertiser may wish to know the mobile analytics groups to which a specific individual John Doe belongs. In this example, Mr. Doe may belong to a "Business Traveler" mobile analytics group and a "Leisure Traveler" mobile analytics group. The user information provisioning engine 120 may provide the advertiser with the fact that Mr. Doe belongs to a "Business Traveler" mobile analytics group and a "Leisure Traveler" mobile analytics group. Advantageously, the user information provisioning engine 120 may allow the advertiser to specifically target Mr. Doe with advertising content without revealing Mr. Doe's PII.

In various embodiments, the user information provisioning engine 120 may supply an advertiser with a list of some or all of the members in a mobile analytics group or even the PII of the members. For instance, the user information provisioning engine 120 may supply a user's score, a user's usage time, specific events, and/or specific event triggers to an advertiser. In various embodiments, the user information provisioning engine 120 may supply any or all of the list of the members in a mobile analytics group, a user's score, a user's usage time, a user's contact information (e.g., the user's email address), some or all of a user's account information and/or profile information, specific events, and/or specific event triggers to an advertising campaign engine (not shown). An advertising campaign engine is a set of hardware and/or software used to provide revenue generating materials (e.g., advertisements) to a set of people and/or entities. In some embodiments, the user information provisioning engine 120 may store any or all of the list of the members in a mobile analytics group, a user's score, a user's usage time, specific events, or specific event triggers in the mobile analytics group datastore 122.

FIG. 2 depicts a mobile device 102, including a mobile application execution engine 106 and a client datastore 212, according to some embodiments. The mobile application execution engine 106 may include a mobile component launch and exit engine 202, a revenue targeting client engine 204, and a reporting engine 210. Any or all of the mobile component launch and exit engine 202, the revenue targeting client engine 204, and the reporting engine 210 may include hardware and/or software. Any or all of the mobile component launch and exit engine 202, the revenue targeting client engine 204, and the reporting engine 210 may have been developed using an SDK.

The mobile component launch and exit engine 202 may initialize system, application and/or other components. In some embodiments, the mobile component launch and exit engine 202 may implement instructions to a processor on the mobile device 102 to load application components from storage to memory. In various embodiments, the mobile component launch and exit engine 202 may also include hardware and/or software to end applications. The mobile component launch and exit engine 202 may implement instructions to a processor to save to the client datastore 212 one or more states of a mobile application running in the runtime environment of the mobile application execution engine 106.

Though FIG. 2 shows the mobile component launch and exit engine 202 inside the mobile application execution engine 106, those of ordinary skill in the art will appreciate that the mobile component launch and exit engine 202 need not reside within the mobile application execution engine 106. In some embodiments, part or all of the mobile component launch and exit engine 202 may reside within the operating system of the mobile device 102. In various embodiments, some or all of the mobile component launch and exit engine 202 may reside within an application other than the application executed by the mobile application execution engine 106.

The revenue targeting client engine 204 may monitor events occurring on the mobile device 102. The revenue targeting client engine 204 may include a timer engine 206 and an event monitoring engine 208.

The timer engine 206 may monitor the time a mobile application has been used. In some embodiments, the timer engine 206 may be implemented as a clock or as a link to a system clock on the mobile device 102. In various embodiments, the timer engine 206 may include interfaces with a timer associated with the operating system of the mobile device 102. The timer engine 206 may provide to the reporting engine 210 a value corresponding to the amount of time that a user has interacted with the mobile application.

The event monitoring engine 208 may monitor a state of the mobile application. The state may include data in memory, the data in the client datastore 212, the data associated with user input and/or output, and/or other data in the mobile application. Examples of states of the mobile application include without limitation: points or levels in a game, specific data entered (e.g., a destination entered in a travel application, a purchase amount entered into a shopping application), data that the mobile application is presently writing or previously wrote into the client datastore 212, physical memory or other system parameters at a given time, and/or a user's location derived from a geography-based transmitter such as a Global Positioning System (GPS) unit.

In various embodiments, the event monitoring engine 208 may capture the state of the mobile application at a given time interval and/or each time the state of the mobile application changes. The event monitoring engine 208 may incorporate a log that is updated at the given time interval and/or at the time of the state change. In some embodiments, the event monitoring engine 208 may compare captured states to stored states (e.g., the client datastore 212). In various embodiments, the event monitoring engine 208 may be configured to provide to the reporting engine 210 the captured state along with a timestamp and/or other information.

The reporting engine 210 may output revenue targeting information. In some embodiments, the reporting engine 210 may interface with a network (e.g., the network 104 in FIG. 1) and provide time and/or state information. The reporting engine 210 may also store time and/or state information in the client datastore 212.

The client datastore 212 may store data related to the mobile application executing inside the runtime environment of the mobile application execution engine 106. The client datastore 212 may be implemented on persistent storage and may comprise volatile and/or non-volatile storage. The client datastore 212 may include storage to hold portions of the mobile application that are not executing. The client datastore 212 may further include a cache that rapidly provides portions of the mobile application for execution. The client datastore 212 may also be configured to store numbers corresponding to the amount of time that an application has executed. In some embodiments, the client datastore 212 may be configured to store a state of the mobile application.

FIG. 3A depicts a server 110, according to some embodiments. The targeting profile engine 112 may include a mobile analytics time selection engine 302, a mobile application selection engine 304, an application description capture engine 306, an application description parsing engine 308, and a targeting profile management engine 310. Any or all of the mobile analytics time selection engine 302, the mobile application selection engine 304, the application description capture engine 306, the application description parsing engine 308, and the targeting profile management engine 310 may include hardware and/or software. Any or all of the mobile analytics time selection engine 302, the mobile application selection engine 304, the application description capture engine 306, the application description parsing engine 308, and the targeting profile management engine 310 may have been developed using an SDK.

The mobile analytics time selection engine 302 may specify an analytics time period. As used herein, an "analytics time period" is a duration of time for which an advertiser wants to monitor a mobile application user's application usage. The analytics time period may depend on an advertising target criterion. As used herein, an advertising target criterion is a temporal, geographic, or other criteria/scope for which advertisements are deemed relevant. In some embodiments, the advertising target criterion and/or the analytics time period may be predetermined values specified by a developer when coding the mobile analytics time selection engine 302 (e.g., with the revenue targeting SDK). In various embodiments, the mobile analytics time selection engine 302 may also receive the advertising target criterion and/or the analytics time period via a network connection or from the application datastore 114 or other datastores.

The mobile application selection engine 304 may select a mobile application for usage classification during the analytics time period. As used herein, "usage classification" means categorization of a mobile application according to an application description associated with the mobile application for the purpose of targeted revenue generation. The selection may be consistent with database queries such as Structured Query Language (SQL) queries or other relational database queries.

The application description capture engine 306 may gather application descriptions of mobile applications. The application description capture engine 306 may implement queries of the descriptions of the mobile applications associated with the mobile application names in the application datastore 114. In some embodiments, the queries from the application description capture engine 306 may be consistent with Structured Query Language (SQL) queries or other relational database queries. Queries of mobile application descriptions may comprise a search for the presence of particular keywords in the mobile application marketplace descriptions associated with the mobile applications. As used herein, a "mobile application marketplace" is an application that allows mobile application users to manage mobile applications that they have purchased and/or installed. In some embodiments, the mobile application marketplace may comprise the iTunes® Application Store or the Google Play® store. For each mobile application in the mobile application marketplace, there may be an associated description which contains information about the mobile application. The description may be supplied by a mobile application developer or may come from other sources, such as other users of the mobile application.

In some embodiments, the application description capture engine 306 may use an analytics time period to gather mobile application names and descriptions for that period. It is noted that although analytics time periods are used for fuller disclosure of the inventive concepts described herein, embodiments of the application description capture engine 306 may gather application names and application descriptions without using analytics time periods.

The application description parsing engine 308 may parse application descriptions gathered by the application description capture engine 306. More specifically, the application description parsing engine 308 may separate application descriptions into component parts. The application description parsing engine 308 may also provide the data structure to other engines or may store the data structure in storage, such as the application datastore 114 or other datastores communicatively coupled to the targeting profile engine 112.

The targeting profile management engine 310 may create and/or update targeting profiles. As discussed, a targeting profile or a "persona" is a data structure that associates a group of potential purchasers with a set of mobile application descriptions. Examples of mobile application descriptions corresponding to the foregoing targeting profiles can be found in Table 1.

In various embodiments, the targeting profile management engine 310 may build the targeting profiles based on the parsed mobile application descriptions from the application description parsing engine 308. Further, the targeting profile management engine 310 may store the targeting profiles in a datastore (e.g., the application datastore 114 or other datastore). The targeting profile management engine 310 may also provide the targeting profiles to other engines or other applications residing on the server 110 or on other devices. The application datastore 114 may store application names and application descriptions.

In some embodiments, the application datastore 114 may be linked to the mobile application marketplace. As a result, the application datastore 114 may be linked to the iTunes® Application Store or the Google Play® store. The application datastore 114 may also periodically monitor an online mobile application marketplace for applications, application descriptions, and related updates. The application datastore 114 may be implemented as storage local to the server 110 or remote to the server 110. In some embodiments, the application datastore 114 may be communicatively coupled to the server 110 using a network connection.

FIG. 3B depicts a server 110, according to some embodiments. The server 110 may include a targeting profile engine 112, a mobile analytics group creation engine 116, a user information provisioning engine 120, and a user datastore 118. Any or all of the targeting profile engine 112, the mobile analytics group creation engine 116, the user information provisioning engine 120, and the user datastore 118 may include hardware and/or software. Any or all of the targeting profile engine 112, the mobile analytics group creation engine 116, the user information provisioning engine 120, and the user datastore 118 may have been developed using an SDK.

The targeting profile engine 112 may register a set of mobile applications for targeted revenue generation. The targeting profile engine 112 may search the application datastore 114 (shown in FIG. 3A) for application descriptions associated with mobile applications so that targeting profiles can be built and/or modified.

The mobile analytics group creation engine 116 may create mobile analytics groups for groups of users based on the way the users interact with mobile applications in a specific targeting profile. The mobile analytics group creation engine 116 may include a user-target profile gathering engine 312, a user and application usage gathering engine 314, a usage scoring and mobile analytics grouping engine 316. In some embodiments, the user-target profile gathering engine 312 may be coupled to the targeting profile engine 112 and the usage scoring and mobile analytics grouping engine 316. In various embodiments, the user and application usage gathering engine 314 may be coupled to the user datastore 118 and the usage scoring and mobile analytics grouping engine 316. The usage scoring and mobile analytics grouping engine 316 may be coupled to the user-target profile gathering engine 312, the user and application usage gathering engine 314, and the user information provisioning engine 120.

The user-target profile gathering engine 312 may obtain targeting profiles for a mobile application. In one example, the user-target profile gathering engine 312 may be configured to provide instructions to request a two-column data structure from the targeting profile engine 112. The first column may correspond to a targeting profile name and the second column may correspond mobile application descriptions associated with a specific targeting profile name. In some embodiments, the user-target profile gathering engine 312 may store a gathered targeting profile. In various embodiments, storage may be local to mobile analytics group creation engine 116, local to another part of the server 110, or remote to the server 110 over a network connection. Whether or not a targeting profile is stored, the user-target profile gathering engine 312 may also transmit a targeting profile to the mobile analytics grouping engine 318 for further processing.

The user and application usage gathering engine 314 may obtain a user profile. and/or obtain application-specific events corresponding to a given user. In some embodiments, the user and application usage gathering engine 314 may be configured to request a three-column data structure from the user datastore 118. The first column may contain a user identifier, such as a username, a unique user identification, or a user number. The first column may further contain profile information, such as a user's contact information, preferences, and personal information. The second column may contain a mobile application that the user has interacted with. The third column may contain a set of application-specific events corresponding to the mobile application and to the user. For instance, the third column may contain a duration that the user has interacted with mobile application. The third column, in various embodiments, may contain a state of the mobile application at a given time.

The usage scoring and mobile analytics grouping engine 316 may score the extent a user has interacted with a mobile application or a set of mobile applications and to group users based on their scores. More specifically, the usage scoring and mobile analytics grouping engine 316 may be capable of receiving a set of target profiles from the user-target profile gathering engine 312. The set of target profiles may comprise a two-column data structure that includes targeting profile name in one column and mobile application descriptions associated with a specific targeting profile name in a second column. The usage scoring and mobile analytics grouping engine 316 may also receive user profiles and application-specific events corresponding to a given user. The set of user profiles may take the form of a three-column data structure that includes: a user's identifier/profile information, a mobile application that the user has interacted with, and a set of application-specific events corresponding to the mobile application and to the user.

The usage scoring and mobile analytics grouping engine 316 may be configured to score a user's interaction with a mobile application or set of mobile applications. As described herein, a score may be an indicator, such as a numerical indicator, of the extent of a user's involvement with a particular mobile application or set of mobile applications. The score may be calculated periodically or may depend on mobile-application specific triggers.

In some embodiments, the usage scoring and mobile analytics grouping engine 316 may include hardware and/or software to create or update one or more mobile analytics groups of users based on their scores.

The user information provisioning engine 120 may include hardware and/or software operative to provide mobile analytics groups to targeted revenue generation sources. For instance, the user information provisioning engine 120 may supply an advertiser with a list of all of the members in a mobile analytics group. As discussed, in some embodiments, the user information provisioning engine 120 may also supply a user's score, a user's usage time, specific events, or specific event triggers to an advertiser. In various embodiments, the user information provisioning engine 120 may supply any or all of the list of the members in a mobile analytics group, a user's score, a user's usage time, specific events, or specific event triggers to an advertising campaign engine (not shown). In some embodiments, the user information provisioning engine 120 may store any or all of the list of the members in a mobile analytics group, a user's score, a user's usage time, specific events, or specific event triggers in the mobile analytics group datastore 122.

FIG. 4 depicts an exemplary flow diagram of a method 400 for detecting and reporting mobile application-specific triggers, according to some embodiments. The following discussion presents the steps of the method 400 in light of the structures disclosed in FIG. 2.

In step 402, the mobile component launch and exit engine 202 may begin executing a mobile application. In some embodiments, the mobile component launch and exit engine 202 may instruct a processor on the mobile device 102 to retrieve portions of a mobile application for execution in the runtime environment of the mobile application execution engine 106. In various embodiments, the mobile component launch and exit engine 202 may retrieve the components of the mobile application from the client datastore 212 and place the components of the mobile application into the memory of the mobile device 102.

In step 404, the mobile component launch and exit engine 202 may launch the revenue targeting client engine 204. In some embodiments, the mobile component launch and exit engine 202 may retrieve portions of the revenue targeting client engine 204 for execution in the runtime environment of the mobile application execution engine 106. The mobile component launch and exit engine 202 may retrieve the components of the revenue targeting client engine 204 from the client datastore 212 and place the revenue targeting client engine 204 into the memory of the mobile device 102.

In step 406, the timer engine 206 may initiate a mobile application timer. When the mobile component launch and exit engine 202 loads the revenue targeting client engine 204 into memory, the mobile component launch and exit engine 202 may create an instance of the timer engine 206. In some embodiments, the timer engine 206 may use a clock or a link to a system clock on the mobile device 102 to monitor the amount of time that has elapsed since the revenue targeting client engine 204 was loaded into memory. The timer engine 206 may also provide adjustments to compensate for the extent the time that the mobile component launch and exit engine 202 loaded into memory the revenue targeting client engine 204 differed from the time that the mobile component launch and exit engine 202 loaded into memory the other components of the mobile application.

In step 408, the event monitoring engine 208 monitors for mobile application-specific triggers. Mobile application-specific triggers are occurrences that result in the existence of a mobile application specific event. Mobile application-specific triggers may include a state change of the mobile application. Examples of states of a mobile application include without limitation: points or levels in a game, specific data entered (e.g., a destination entered in a travel application, a purchase amount entered into a shopping application), data that the mobile application is presently writing or previously wrote into the client datastore 212, physical memory or other system parameters at a given time, and/or a user's location derived from a geography-based transmitter such as a Global Positioning System (GPS) unit. In various embodiments, the event monitoring engine 208 may periodically check for state updates or changes in mobile-application specific triggers.

In decision point 410, the event monitoring engine 208 may determine whether it detected a mobile application-specific trigger. Any time any one of the states of the mobile application changes (e.g., a user's destination in a travel application changes), the event monitoring engine 208 may capture the state change. The event monitoring engine 208 may also capture the state of the mobile application at a given time interval or each time the state of the mobile application changes. The event monitoring engine 208 may also compare captured states to stored states located on storage (e.g., the client datastore 212). When a captured state matches a stored state, the event monitoring engine 208 may indicate that a mobile application-specific trigger was detected.

If the event monitoring engine 208 detected a mobile application-specific trigger, the event monitoring engine 208 may provide to the reporting engine 210 the captured state along with a timestamp and other information and proceed to step 412. In step 412, the reporting engine 210 may report the mobile application-specific event associated with the trigger. In some embodiments, the reporting engine 210 may interface with the network 104 (shown in FIG. 1) and provide state information. Pursuant to step 412, the reporting engine 210 may also store the state information in the client datastore 212.

If the event monitoring engine 208 did not detect a mobile application-specific trigger, the mobile application execution engine 106 may proceed to decision point 414. In decision point 414, the mobile application execution engine 106 determines whether it received an instruction to exit the mobile application. If the mobile application execution engine 106 did not receive an instruction to exit the mobile application, the flowchart 400 may return to step 408. If the mobile application execution engine 106 did receive an instruction to exit the mobile application, the mobile application execution engine 106 may proceed to step 416.

In step 416, the timer engine 206 ends the mobile application timer. In some embodiments, the timer engine 206 may clear timer data from the memory of the mobile device 102 and write information to the client datastore 212. The timer engine 206 may also provide to the reporting engine 210 a numerical value corresponding to the amount of time elapsed since initialization.

In step 418, the reporting engine 210 may report the mobile application usage time. In various embodiments, the reporting engine 210 may interface with a network (e.g., the network 104 in FIG. 1) and provide the elapsed time.

Pursuant to step 412, the reporting engine 210 may also store the elapsed time in the client datastore 212.

In step 420, the mobile component launch and exit engine 202 may end the instance of the revenue targeting client engine 204. In various embodiments, the mobile component launch and exit engine 202 may clear the instance of the revenue targeting client engine 204 from the memory of the mobile device 102.

In step 422, the mobile component launch and exit engine 202 may provide an instruction to exit the mobile application. In various embodiments, the mobile component launch and exit engine 202 may instruct a processor on the mobile device 102 to save a state of an application running pursuant to the mobile application execution engine 106 to the client datastore 212. The mobile component launch and exit engine 202 may also clear the portions of the revenue targeting client engine 204 and the reporting engine 210 from the memory of the mobile device 102.

FIG. 5 depicts an exemplary flow diagram of a method 500 for creating and/or managing a mobile-application revenue targeting profile for an analytics time period. The following discussion presents the steps of the method 500 in light of the structures disclosed in FIG. 3A.

In step 502, the mobile analytics time selection engine 302 selects an analytics time period based on an advertising target criterion. The advertising target criterion and/or the analytics time period may be predetermined values specified by a developer when developing the mobile analytics time selection engine 302 with the revenue targeting SDK. In various embodiments, the mobile analytics time selection engine 302 may also receive the advertising target criterion and/or the analytics time period via a network connection or from the application datastore 114 or other datastores. In some embodiments, the advertising target criterion may specify that a given set of advertising needs require registering a set of mobile applications for targeted revenue generation for a short period (e.g., thirty days) that analytics data is available. In such a case, the mobile analytics time selection engine 302 may specify an analytics time period of thirty days based on the advertising target criterion regarding that duration for application registration.

In step 504, the mobile application selection engine 304 selects a mobile application for usage classification during the analytics time period. In some embodiments, the mobile application selection engine 304 may search the names of mobile applications stored in the application datastore 114 and may load the names of queried mobile applications into memory. The queries may be consistent with SQL queries. In various embodiments, the application datastore 114 may return to the mobile application selection engine 304 a data structure having, as one column, application names, and as a second column, application description. The application datastore 114 may also return to the mobile application selection engine 304 a indication of use. For instance, the application datastore 114 may return to the mobile application selection engine 304 the average amount of time users interact with a given mobile application. The mobile application selection engine 304 may provide the selected application, along with the description of the selected application, to the application description capture engine 306.

In step 506, the application description capture engine 306 may gather an application description for the mobile application. In some embodiments, the application description capture engine 306 may separate out the second column (i.e., the application description column) of the data structure from the mobile application selection engine 304.

The application description capture engine 306 may execute database queries (e.g., SQL queries) to search for the presence of particular keywords in mobile application marketplace descriptions associated with the mobile applications. For instance, suppose the mobile application "Kayak" has the following application description associated with it in the application datastore 114: "Compare flights, hotels and rental cars, track flights, get cheap travel deals . . . ." Further, suppose the mobile application "Tripit" has the following application description associated with it in the application datastore 114: "Get peace of mind while traveling, by having all your plans in one place. Tripit is an easier way to organize and share travel." In these examples, the application description capture engine 306 may gather the application descriptions of the mobile applications Kayak and Tripit. In various embodiments, the application description capture engine 306 may also gather application descriptions by directly gathering the names of specific mobile applications. For instance, the keywords "Hipster/Indie" may not easily define a mobile analytics group. In such a case, mobile applications names such as "PBR me ASAP" and "Band Name Generator" may provide indicators as to the application descriptions of the specific mobile applications "PBR me ASAP" and "Band Name Generator."

In these examples, the application description capture engine 306 may use an analytics time period, such as thirty days, to gather mobile application names and descriptions for that period. It is noted that although analytics time periods are used for fuller disclosure of the inventive concepts described herein, embodiments of the application description capture engine 306 may gather application names and application descriptions without using analytics time periods.

In step 508, the application description parsing engine 308 may parse the application description for revenue-related target words. As used herein, "revenue-related target words" are keywords related to targeted revenue generation. In some embodiments, the application description parsing engine 308 may be configured to separate application descriptions gathered by the application description capture engine 306 into component parts. In the examples above relating to step 506, the application description parsing engine 308 may separate the description of the mobile application Kayak into the following parsed mobile application descriptions: "Compare," "flights," "hotels," "rental cars," "track" "flights," "cheap travel deals." Further, the application description parsing engine 308 may separate the description of the mobile application Tripit into the following parsed mobile application descriptions: "traveling," "plans," "organize . . . travel," "share travel." In some embodiments, the application description parsing engine 308 may create a new data structure that includes, as one field, an application name, and as a second field, a parsed mobile application description. The application description parsing engine 308 may provide the data structure to other engines or may store the data structure in storage, such as the application datastore 114 or other datastores communicatively coupled to the targeting profile engine 112.

In step 510, the targeting profile management engine 310 may modify a targeting profile using the revenue-related target words. As discussed, a targeting profile or a "persona" is a data structure that associates a group of potential purchasers with a set of mobile application descriptions. For instance, the mobile applications "Kayak" and "Tripit" may, based on their descriptions be associated with a targeting profile of a "Business Traveler." Other targeting profiles may include: Leisure Traveler, Socially Influenced/Socially Connected, Real Estate Follower, Auto Insurance Consumer, Auto Enthusiast, Personal Finance Geek, Casual/Social Gamer, Hardcore Gamer, Sports Fanatic, Heath & Fitness Conscious, Men's Lifestyle Addict, Parenting, College Student, Hipster/Indie, Fashionista, Heavy Grocery Shopper, Discount Hunter/Offer Seekers, Entertainment: Movies, Entertainment: TV, Entertainment: Events, Music Enthusiast, Tech/Gadget Enthusiast, Pet Owners, Home Improvement, Singles, Avid Readers, Food & Dining, Young Business Professionals, Business Decision Maker, New Moms, etc. Examples of mobile application descriptions corresponding to the foregoing targeting profiles can be found in Table 1. Modifying the targeting profile may include creating a new targeting profile or updating an existing targeting profile.

The targeting profile management engine 310 may perform a check to determine whether a targeting profile exists in the application datastore 114. If no targeting profile in the application datastore 114, the targeting profile management engine 310 may build the targeting profiles based on the parsed mobile application descriptions from the application description parsing engine 308. Further, the targeting profile management engine 310 may store the targeting profiles in the application datastore 114. If a targeting profile exists in the application datastore 114, the targeting profile management engine 310 may update the targeting profile to include the parsed mobile application descriptions from the application description parsing engine 308. The targeting profile management engine 310 may also provide the targeting profiles to other engines or other applications residing on the server 110 or on other devices.

FIG. 6 depicts an exemplary flow diagram of a method 600 for grouping mobile application users into mobile analytics groups, according to some embodiments. The following discussion presents the steps of the method 600 in light of the structures disclosed in FIG. 3B.

In step 602, the user-target profile gathering engine 312 may obtain a targeting profile for a mobile application or a mobile application circle. In some embodiments, the user-target profile gathering engine 312 may be configured to request a two-column data structure from the targeting profile engine 112. The first column may correspond to a targeting profile name and the second column may correspond mobile application descriptions associated with a specific targeting profile name. In some embodiments, the user-target profile gathering engine 312 may store a gathered targeting profile. In some embodiments, the targeting profile may be related to a mobile application circle of several mobile applications.

In step 604, the user and application usage gathering engine 314 may obtain a set of users from the user datastore 118, the set of users being associated with the targeting profile. In some embodiments, the user and application usage gathering engine 314 may be configured to request a three-column data structure from the user datastore 118. The first column may contain a user identifier, such as a username, a unique user identification, or a user number. The first column may further contain profile information, such as a user's contact information, preferences, and personal information. The second column may contain a mobile application that the user has interacted with.

In step 606, the user and application usage gathering engine 314 may obtain mobile application usage parameters for the set of users. As used herein, "application usage parameters" may comprise attributes of a user's engagement with a mobile application. Examples of application usage parameters include usage time and/or a list of mobile application-specific triggers. I, the user and application usage gathering engine 314 may be configured to request a three-column data structure from the user datastore 118. The third column of this three-column data structure may contain a set of application-specific events corresponding to the mobile application and to the user. For instance, the third column may contain a duration that the user has interacted with mobile application. The third column, in various embodiments, may contain a state of the mobile application at a given time. For example, the third column may contain one or more of: points or levels in a game, specific data entered (e.g., a destination entered in a travel application, a purchase amount entered into a shopping application), data that the mobile application is presently writing or previously wrote into the client datastore 212, physical memory or other system parameters at a given time, a user's location derived from a geography-based transmitter such as a Global Positioning System (GPS) unit, etc. In various embodiments, the user and application usage gathering engine 314 may be configured to transmit the user profile and/or the application-specific events to the usage scoring and mobile analytics grouping engine 316.

In step 608, the usage scoring and mobile analytics grouping engine 316 may score the set of users' interaction with the mobile application based on the mobile application usage parameters to generate a score for the set of users. In some embodiments, the usage scoring and mobile analytics grouping engine 316 may be configured to receive a set of target profiles from the user-target profile gathering engine 312. In some embodiments, the set of target profiles may comprise a two-column data structure that includes targeting profile name in one column and mobile application descriptions associated with a specific targeting profile name in a second column. The usage scoring and mobile analytics grouping engine 316 may also be configured to receive user profiles and application-specific events corresponding to a given user. In various embodiments, the usage scoring and mobile analytics grouping engine 316 may receive a three-column data structure that includes: a user's identifier/profile information, a mobile application that the user has interacted with, and a set of application-specific events corresponding to the mobile application and to the user.

In some embodiments, the usage scoring and mobile analytics grouping engine 316 may be configured to score a user's interaction with a mobile application or set of mobile applications. For instance, the usage scoring and mobile analytics grouping engine 316 may be configured to calculate the amount of time a user has executed a specific mobile application. In such a case, the time the user executed the mobile application may provide an indicator of a score associated with the user's interaction with the mobile application. In some embodiments, the usage scoring and mobile analytics grouping engine 316 may be configured to score a user's interaction with a group of mobile applications that fall within a targeting profile. For example, the usage scoring and mobile analytics grouping engine 316 may classify a user that has the mobile application Kayak and the mobile application Tripit into a targeting profile of a "Business Traveler." See, e.g., Table 1. The usage scoring and mobile analytics grouping engine 316 may determine a score for that user based on the total session duration that these mobile applications were used for a given duration (e.g., the past X days). The given duration may vary per targeting profile. For instance, thirty days may be seen as a relevant targeting duration for a targeting profile of a "Business Traveler,"

while seven days may be seen as a relevant targeting duration for a targeting profile of a "Personal Finance Geek."

In various embodiments, the usage scoring and mobile analytics grouping engine 316 may calculate a user's score periodically, e.g., daily. For example, a user may have used Kayak for five minutes and Tripit for three minutes over the last thirty days, for a total of eight minutes. The usage scoring and mobile analytics grouping engine 316 may calculate the score for that user (based on the combined use of Kayak and Tripit) on a daily-basis.

The usage scoring and mobile analytics grouping engine 316 may also calculate a user's score based on mobile-application specific triggers. For example, the user's score may depend on some combination of: points or levels in a game, specific data entered (e.g., a destination entered in a travel application, a purchase amount entered into a shopping application), data that the mobile application is presently writing or previously wrote into a client datastore, physical memory or other system parameters at a given time, a user's location derived from a geography-based transmitter such as a Global Positioning System (GPS) unit, etc.

In step 610, the usage scoring and mobile analytics grouping engine 316 may group the set of users, based on the score for the set of users, with other users into a mobile analytics group. In various embodiments, the usage scoring and mobile analytics grouping engine 316 may group users based on their percentiles of use within a specific targeting profile. For instance, usage scoring and mobile analytics grouping engine 316 may associate, for each targeting profile, users in a percent (e.g., the top Y percent) with the targeting profile and/or the mobile analytics group for that targeting profile. (E.g., the top 20% of users of mobile applications in the Business Traveler targeting profile may be included in a mobile analytics group associated with that targeting profile.) The percent (i.e., "Y") may vary between targeting profiles and may be adjustable by, among others, makers of the revenue targeting SDK. In some embodiments, the usage scoring and mobile analytics grouping engine 316 may group users based on the minimum number of application sessions of the users over a specified duration of time. For example, the usage scoring and mobile analytics grouping engine 316 may group users who have used a specific mobile application or class of mobile applications (e.g., travel applications) fifty times over the past ten days. In various embodiments, the usage scoring and mobile analytics grouping engine 316 may group users based on an amount of time the users interacted with a mobile application or class of mobile applications over a specified duration of time. For instance, the usage scoring and mobile analytics grouping engine 316 may group users who have interacted with a specific mobile application or class of mobile applications (e.g., travel applications) for an aggregate time of a time, e.g., over 3600 seconds over a specified duration, e.g., over the past ten days. Advantageously, by creating mobile analytics groups based on highly customized indicators of use, the usage scoring and mobile analytics grouping engine 316 may provide advertisers with specific indicators of the mobile usage patterns of users.

Figure 7:
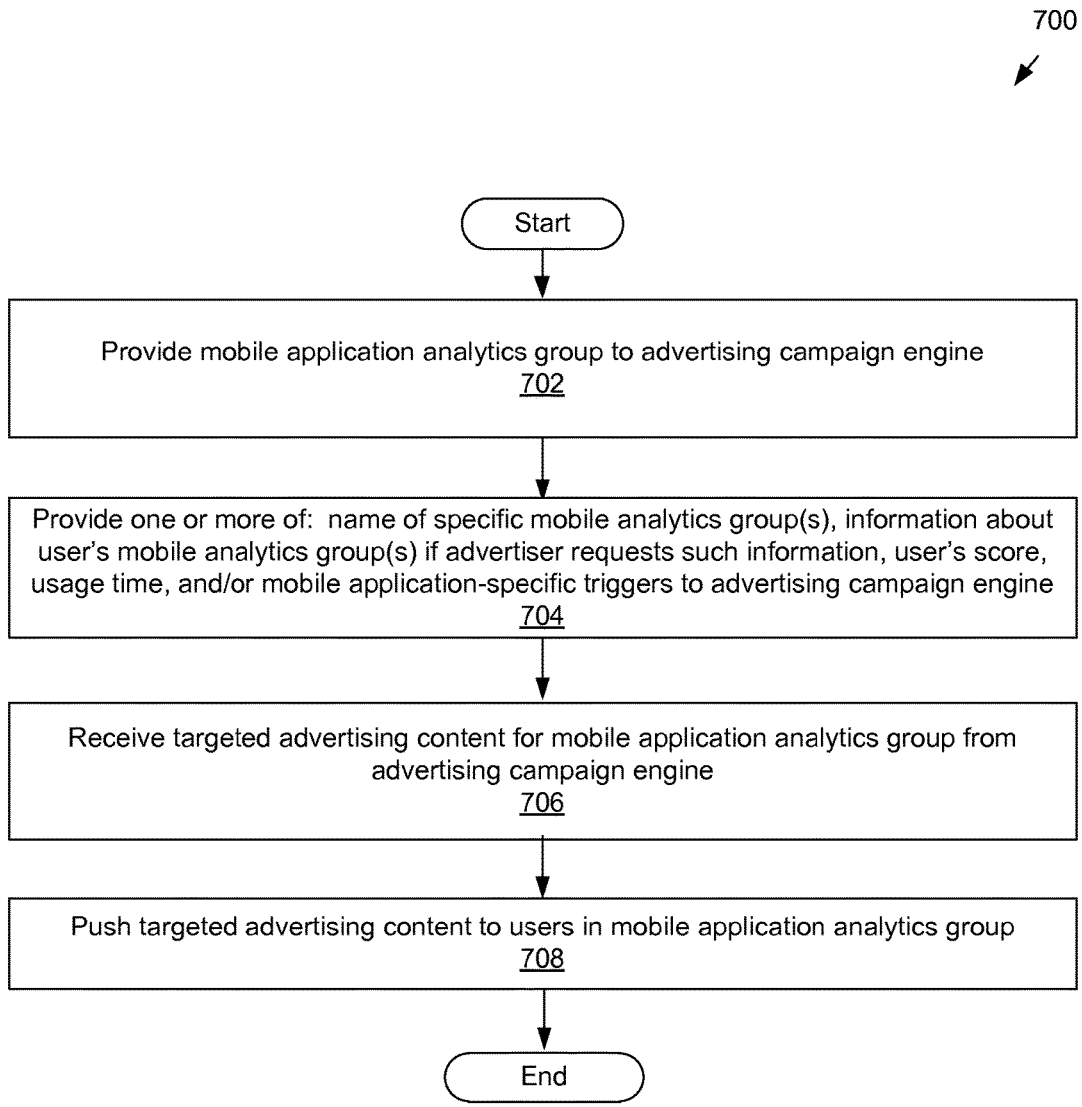
FIG. 7 depicts an exemplary flow diagram of a method for providing targeted advertising content to mobile application users, according to some embodiments.

FIG. 7 depicts an exemplary flow diagram of a method 700 for providing targeted advertising content to mobile application users, according to some embodiments. The following discussion presents the steps of the method 700 in light of the structures disclosed in FIG. 3B.

In step 702, the user information provisioning engine 120 may provide information about the mobile analytics group to an advertising campaign engine. In step 704, the user information provisioning engine 120 may provide one or more of: the name of a specific mobile analytics group or set of mobile analytics groups, information about a specific user's mobile analytics group(s) if an advertiser requests such information, the user's score, the user's usage time, and the user's application-specific triggers to the advertising campaign engine. In step 706, the user information provisioning engine 120 may receive targeted advertising content for the mobile analytics group from the advertising campaign engine. In step 708, the user information provisioning engine 120 may push targeted advertising content to the users in the mobile analytics group.

FIG. 8 depicts a digital device 800, according to some embodiments. The digital device 800 comprises a processor 802, a memory system 804, a storage system 806, a communication network interface 808, an Input/Output (I/O) interface 810, and a display interface 812 communicatively coupled to a bus 814. The processor 802 may be configured to execute executable instructions (e.g., programs). In some embodiments, the processor 802 comprises circuitry or any processor capable of processing the executable instructions.

The memory system 804 is any memory configured to store data. Some examples of the memory system 804 are storage devices, such as RAM or ROM. The memory system 804 may comprise the RAM cache. In various embodiments, data is stored within the memory system 804. The data within the memory system 804 may be cleared or ultimately transferred to the storage system 806.

The storage system 806 is any storage configured to retrieve and store data. Some examples of the storage system 806 are flash drives, hard drives, optical drives, and/or magnetic tape. In some embodiments, the digital device 800 includes a memory system 804 in the form of RAM and a storage system 806 in the form of flash data. Both the memory system 804 and the storage system 806 comprise computer readable media which may store instructions or programs that are executable by a computer processor including the processor 802.

The communication network interface (com. network interface) 808 may be coupled to the data network 104 (shown in FIG. 1) via the link 816. The communication network interface 808 may support communication over an Ethernet connection, a serial connection, a parallel connection, or an ATA connection, for example. The communication network interface 808 may also support wireless communication (e.g., 802.8 a/b/g/n, WiMAX). It will be apparent to those skilled in the art that the communication network interface 808 may support many wired and wireless standards.

The I/O interface 810 is any device that receives input from the user and output data. The display interface 812 is any device that may be configured to output graphics and data to a display. In one example, the display interface 812 is a graphics adapter.

It will be appreciated by those skilled in the art that the hardware elements of the digital device 800 are not limited to those depicted in FIG. 8. A digital device 800 may comprise more or less hardware elements than those depicted. Further, hardware elements may share functionality and still be within various embodiments described herein. In one example, encoding and/or decoding may be performed by the processor 802 and/or a co-processor located on a GPU.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Smartphone users may have multiple apps installed on their phone, which they use with varying frequency. Through FA, Access to the usage data of these apps may be obtained on a per user basis. Each app may be classified to one or more personas based on, but not limited to, (1) their app store category, (2) keywords present in their app store descriptions, and (3) keywords (e.g., the keywords being manually or automatically assigned to them by Flurry). Each user may be given a score for each persona based on their recent usage of apps in that persona. High scorers may then be included in the targeting group for each persona.

Persona-Keyword-App Association

In some embodiments, personas may be defined by either (A) a set of keywords or (B) a set of apps. Any apps may be classified in any number of ways at any time. In one example, apps for which there are recent (30 day) Analytics data may be classified.

Keywords: Apps may be associated with Personas based on the presence of particular Keywords in their app store descriptions. For example, consider the following:

Kayak: Compare flights, hotels and rental cars, track flights, get cheap travel deals . . . and TripIt: Get peace of mind while traveling, by having all your plans in one place. TripIt is an easier way to organize and share travel. from which the keywords flight, hotel, car rental, trip, baggage, airport, travel would be useful to classify the app to the Business Traveler and Leisure Traveler personas.

Apps: Some Personas may not be easily defined by keywords, e.g. Hipster/Indie. Since Hipsters conform to non-conformity (such as beards and flannel), such Personas may be defined by directly associated them with apps, such as "PBR me ASAP" and "Band Name Generator".

User-Persona Scoring

For example, a user that has the Kayak and/or TripIt application installed may be classified into the Business Traveler category. A score for the user may be determined based on the total session duration these apps were used for in the past X days. X may vary per persona, (e.g. 30 days for Business Traveler and 7 days for Personal Finance Geek).

For example, a user may have used Kayak for 5 minutes and TripIt for 3 minutes over the last 30 days, for a total of 8 minutes. This scoring may be calculated for each user persona combination on a daily basis.

User-Persona Targeting Association

In some embodiments, for each Persona, users in the top Y percent of scoring may be associated with the targeting and/or analytics group for that persona. For example, the top 20% of users of Business Traveler apps may be included in the targeting for that Persona. Y may vary between Personas, and should be adjustable by Flurry.

Exemplary Testing & Refining the Design

Finalize the keywords or apps associated with each persona

Classify all Analytics enabled apps from iOS and Android into personas based on store descriptions Do a manual sanity check of the classifications Refine the keyword list to minimize false positives Re-classify apps to personas with refined list Classify all users into Personas based on their 30 day app usage Do a manual check of the number of users in each persona Look at the usage of the 70th, 80th, 90th, 95th percentile users to determine the appropriate cutoff for each Persona.

TABLE 1

Persona - Exemplary Keyword Table

| Persona | App Keywords |
| --- | --- |
| Business Traveler | keywords<br>sample apps (to verify output of keyword model OR to directly associate with persona)<br>Hotel, flight, car, rental, trip, airline, itinerary, travel, agent, expense, event, currency, converter, voltage, plug, airport, TSA, reservation, "exchange rate", departures, arrivals, translate, translation, customs, immigration<br>List of specific business traveler mobile applications |
| Leisure Traveler | Hotel, flight, beach, resort, tourism, airline, travel, attractions, car rental, cruise, vacation, tour, admission, museum, depicts, island, backpacking, B&B,<br>List of specific leisure traveler mobile applications |
| Social Influencer/Socially Connected | social, connect, friends, photo, status, message, chat, group, news, trends, share, tweet, follow, +1,<br>List of specific socially influenced/socially connected mobile applications |
| Real Estate Follower | home, house, condo, townhouse, co-op, property, commercial, residential, estate, broker, sale, rent, bedroom, bathroom, kitchen, "real estate", agent, realtor, foreclosure, case-shiller, REO, bank-owned<br>List of specific real estate mobile applications |
| Auto Insurance Consumer | car, auto, vehicle, insurance, insure, quote, agent, accident, liability, claim, "roadside assistance", policy, "flat tire", gas, motorcycle, boat, RV, towing, tow,<br>List of specific auto insurance consumer mobile applications |

TABLE 1-continued

Persona - Exemplary Keyword Table

| Persona | App Keywords |
|---|---|
| Auto Enthusiast | car, automobile, vehicle, Roadside assistance, repair shop directory, mechanic, fuel, efficiency, mileage, bhp, OBD, speedometer, engine, emissions, garage, acceleration, g-force, top speed, horsepower, torque, racing, race, List of specific auto enthusiast mobile applications |
| Personal Finance Geek | bank, banking, money, credit card, track, budget, dollars, finance, financial, accounts, checking, savings, retirement, 401 k, 401(k), brokerage, IRA, roth, mutual, fund, expenses, cash, credit List of specific personal finance mobile applications |
| Sports Fanatic | sports, baseball, football, golf, tennis, basketball, soccer, hockey, nascar, indy, motorsports, cycling, fantasy, draft, team, PGA, ryder, superbowl, "world series", "final four", "live games", "march madness", UFC, boxing, PGA, NBA, NFL, MLB, MLS, NHL, NCAA, innings, nascar, F1, "formula 1", "formula one", ESPN, List of specific sports fanatic mobile applications |
| Health & Fitness Conscious | health, fitness, muscle, tone, nutrition, diseases, medical conditions, weight loss, exercise, sports, fit, calorie, zone, Weight Watchers List of specific health/fitness mobile applications |
| Men's Lifestyle Addict | humour, fashion, sex, tips, food, wine, liquor, beer, gadgets, music, movies, events, entertainment, cars, gadgets, fashion, grooming, women, List of specific business men's lifestyle applications |
| Parenting | baby, infant, toddler, kids, child, children, breast feeding, formula, diaper, napping, weight percentile, height percentile, sids, thrush, cradle cap, vaccinations, car seat, baby food, baby recipes, potty, toilet training, breast milk, bm, poop, pee List of specific parenting mobile applications |
| College Student | use age estimate + home location in these zip codes: List of specific college student mobile applications |
| Hipster/Indie | List of apps with hipster/indie keywords, e.g., "cool," "hip," urban," indie," brit-pop" |
| Fashionista | clothing, shopping, List of specific fashion mobile applications |
| Heavy Grocery Shopper | grocery, shopping list, supermarket, market, eggs, barcode scanner, coupons List of specific grocery shopping mobile applications |
| Discount Hunter/Offer Seekers | discount, coupons, savings, save, sales, deals List of specific discount hunter mobile applications |
| Entertainment: Movies | movies, theaters, trailers, showtimes, streaming, tickets, entertainment, hollywood, stars, reviews, List of specific entertainment/movie mobile applications |
| Entertainment: TV | TV, depicts, listings, television, video, channels, List of specific entertainment/TV mobile applications |
| Entertainment: Events | music, concerts, broadway, sports, artists, bands, List of specific entertainment/events mobile applications |
| Music Enthusiast | Artists, bands, music, songs, albums, radio, mp3, player, playlist, media, List of specific music mobile applications |
| Tech/Gadget Enthusiast | gadgets, consumer electronics, technology, smartphone, cameras, laptops, HDTV, gaming, apple, google, android, widget, ios, ipad, iphone, samsung, Microsoft List of specific tech/gadget mobile applications |
| Pet Owners | List of specific pet owner mobile applications |
| Home Improvement | List of specific home improvement mobile applications |
| Singles | List of specific singles mobile applications |
| Avid Readers | books, magazine apps ibooks, zinio, kindle, etc. Hearst & Conde Nast apps. |
| Food & Dining | Restaurant, reservation, menu, organic, eat, drink, dining, rating, reviews, delicious, recipe, chef, dishes, OpenTable, yelp, urbanspoon, epicurious, seamless, foursquare, localeats, zagat, alfred, foodspotting, vegout, tipulator, menupages, |
| Young Business Professionals | List of specific young business professionals mobile applications |
| Business Decision Maker | List of specific business mobile applications |
| New Moms | List of specific motherhood/parenting mobile applications |

We claim:

1. A method comprising:

obtaining, by a server computing device, a targeting profile assembled using a description of a mobile application, the targeting profile associating a user persona identifier with information descriptive of the mobile application;

obtaining, by the server computing device, a set of users from a user datastore, the set of users being associated with the mobile application;

obtaining, by the server computing device, mobile application usage parameters for the set of users;

determining, by the server computing device, a set of numeric usage scores, the set of numeric usage scores comprising a numeric usage score for each user of the set, the numeric usage score being determined for a user using the usage parameters associated with the user and the mobile application, the numeric usage score determined for the user is a numeric value indicative of an interaction level of the user with the mobile application, the interaction level is determined in part by tracking system parameters of the system running the mobile application;

selecting, by the server computing device, a number of the users from the set of users for inclusion in a mobile analytics group corresponding to the targeting profile based on the numeric usage score determined for each user of the set;

obtaining, via the server computing device, advertising content in response to a request for the advertising content, the request comprising the user persona identifier from the obtained targeting profile as content selection criteria descriptive of the mobile analytics group of users selected from the set of users using the set of numeric usage scores determined for the set of users; and transmitting, via the server computing device and over an electronic communications network to a user computing device associated with a user of the number of users selected for the mobile analytics group, the advertising content corresponding to the mobile analytics group.

2. The method of claim 1, wherein the usage parameters comprise a usage time of the mobile application.

3. The method of claim 1, wherein the usage parameters comprise a mobile application-specific trigger for the mobile application.

4. The method of claim 1, further comprising setting an analytics time period based on an advertising target criterion wherein the obtaining obtains the mobile application usage parameters for the set of users for the analytics time period.

5. The method of claim 1, further comprising gathering the description of the mobile application, parsing the description of the mobile application for one or more target words, and modifying the information descriptive of the mobile application of the targeting profile to include the one or more target words from the description of the mobile application.

6. The method of claim 1, further comprising gathering the description of the mobile application, parsing the description of the application for a number of keywords, and creating the targeting profile using the number of keywords from the description of the mobile application to generate the information descriptive of the mobile application.

7. A system comprising:

a computing device comprising a processor and a storage medium for tangibly storing thereon program logic for execution by the processor, the program logic comprising:

obtaining logic executed by the processor for obtaining a targeting profile assembled using a description of a mobile application, the targeting profile associating a user persona identifier with information descriptive of the mobile application;

obtaining logic executed by the processor for obtaining a set of users from a user datastore, the set of users being associated with the mobile application;

obtaining logic executed by the processor for obtaining mobile application usage parameters for the set of users;

determining logic executed by the processor for determining a set of numeric usage scores, the set comprising a numeric usage score for each user of the set, the numeric usage score being determined for a user using the usage parameters associated with the user and the mobile application, the numeric usage score determined for the user is a numeric value indicative of an interaction level of the user with the mobile application, the interaction level is determined in part by tracking system parameters of the system running the mobile application;

selecting logic executed by the processor for selecting a number of the users from the set of users for inclusion in a mobile analytics group corresponding to the targeting profile based on the numeric usage score determined for each user of the set;

obtaining logic executed by the processor for obtaining advertising content in response to a request for the advertising content, the request comprising the user persona identifier from the obtained targeting profile as content selection criteria descriptive of the mobile analytics group of users selected from the set of users using the set of numeric usage scores determined for the set of users; and transmitting logic executed by the processor for transmitting, over an electronic communications network to a user computing device associated with a user of the number of users selected for the mobile analytics group, the advertising content corresponding to the mobile analytics group.

8. The system of claim 7, wherein the usage parameters comprise a usage time of the mobile application.

9. The system of claim 7, wherein the usage parameters comprise a mobile application-specific trigger for the mobile application.

10. The system of claim 7, further comprising setting logic executed by the processor for setting an analytics time period based on an advertising target criterion, the obtaining logic executed by the processor for obtaining obtains the mobile application usage parameters for the set of users for the analytics time period.

11. The system of claim 7, further comprising gathering logic executed by the processor for gathering the description of the mobile application, parsing logic executed by the processor for parsing the description of the mobile application for one or more target words, and modifying logic executed by the processor for modifying information descriptive of the mobile application of the targeting profile to include the one or more target words from the description of the mobile application.

12. The system of claim 7, further comprising gathering logic executed by the processor for gathering the description of the mobile application, parsing logic executed by the processor for parsing the description of the mobile application for a number of target words, and creating logic executed by the processor for creating the targeting profile using the number of target words from the description of the mobile application to generate the information descriptive of the mobile application.

13. A non-transitory computer readable storage medium configured to store instructions, the instructions comprising a method, the method comprising:

obtaining a targeting profile assembled using a description of a mobile application, the targeting profile associating a user persona identifier with information descriptive of the mobile application;

obtaining a set of users from a user datastore, the set of users being associated with the mobile application;

obtaining mobile application usage parameters for the set of users;

determining a set of numeric usage scores, the set of numeric usage scores comprising a numeric usage score for each user of the set, the numeric usage score being determined for a user using the usage parameters associated with the user and the mobile application, the numeric usage score determined for the user is a numeric value indicative of an interaction level of the user with the mobile application, the interaction level is determined in part by tracking system parameters of the system running the mobile application; and selecting a number of the users from the set of users for inclusion in a mobile analytics group corresponding to the targeting profile based on the numeric usage score determined for each user of the set;

obtaining advertising content in response to a request for the advertising content, the request comprising the user persona identifier from the obtained targeting profile as content selection criteria descriptive of the mobile analytics group of users selected from the set of users using the set of numeric usage scores determined for the set of users; and transmitting, over an electronic communications network to a user computing device associated with a user of the number of users selected for the mobile analytics group, the advertising content corresponding to the mobile analytics group.

14. The non-transitory computer readable storage medium of claim 13, wherein the usage parameters comprise a usage time of the mobile application.

15. The non-transitory computer readable storage medium of claim 13, wherein the usage parameters comprise a mobile application-specific trigger for the mobile application.

* * * * *